United States Patent
Heller et al.

(10) Patent No.: US 9,098,396 B2
(45) Date of Patent: Aug. 4, 2015

(54) ENHANCEMENT OF EFFICIENCY IN POWER FAILURE HANDLING IN FLASH MEMORY

(75) Inventors: Tal Heller, Aloney Abba (IL); Nir Perry, Holon (IL); Ori Moshe Stern, Modeen (IL); Yacov Duzly, Raanana (IL)

(73) Assignee: SanDisk IL Ltd., Kfar Saba (IL)

( * ) Notice: Subject to any disclaimer, the term of this patent is extended or adjusted under 35 U.S.C. 154(b) by 753 days.

(21) Appl. No.: 12/706,474

(22) Filed: Feb. 16, 2010

(65) Prior Publication Data

US 2010/0235594 A1    Sep. 16, 2010

Related U.S. Application Data

(60) Provisional application No. 61/207,679, filed on Feb. 13, 2009.

(51) Int. Cl.
```
G06F 12/00      (2006.01)
G06F 13/00      (2006.01)
G06F 13/28      (2006.01)
G06F 12/02      (2006.01)
G06F 11/14      (2006.01)
```

(52) U.S. Cl.
CPC ........ *G06F 12/0246* (2013.01); *G06F 11/1441* (2013.01); *G06F 11/1446* (2013.01); *G06F 2212/1032* (2013.01); *Y02B 60/1225* (2013.01)

(58) Field of Classification Search
USPC ................. 711/103, 115; 365/185.33, 185.29
See application file for complete search history.

(56) References Cited

U.S. PATENT DOCUMENTS

| | | | |
|---|---|---|---|
| 5,809,558 A * | 9/1998 | Matthews et al. | 711/173 |
| 6,038,636 A * | 3/2000 | Brown et al. | 711/103 |
| 6,400,634 B1 * | 6/2002 | Liou et al. | 365/230.03 |
| 6,967,869 B1 * | 11/2005 | Kolokowsky | 365/185.11 |
| 6,988,175 B2 | 1/2006 | Lasser | |
| 7,275,140 B2 | 9/2007 | Paley | |
| 7,487,303 B2 * | 2/2009 | Song et al. | 711/154 |
| 2002/0129192 A1 * | 9/2002 | Spiegel et al. | 711/103 |
| 2005/0044332 A1 * | 2/2005 | de Brebisson | 711/162 |
| 2006/0203546 A1 * | 9/2006 | Lasser | 365/185.09 |
| 2007/0033328 A1 * | 2/2007 | Sinclair et al. | 711/103 |
| 2007/0156998 A1 * | 7/2007 | Gorobets | 711/170 |
| 2008/0307156 A1 | 12/2008 | Sinclair | |
| 2008/0307158 A1 | 12/2008 | Sinclair | |

OTHER PUBLICATIONS

U.S. Appl. No. 12/706,504, filed Feb. 16, 2010, entitled "Enhancement of Storage Life Expectancy by Bad Block Management" (35 pages).

* cited by examiner

*Primary Examiner* — Yaima Rigol
(74) *Attorney, Agent, or Firm* — Brinks Gilson & Lione

(57) ABSTRACT

A method and system for enhancing efficiency in power failure handling in flash memory devices is disclosed. The method includes the controller of a storage device receiving a page of data, selecting a block having a desired back-up cost and copying previously stored data in the selected block to a back-up block prior to writing the received page to the selected block based on a category of the previously stored data. The system includes non-volatile memory having a plurality of operative blocks, at least one spare block and a controller. The controller is configured to receive a page of data, select an operative block in the memory having a desired back-up cost, and copy previously stored data in the selected block to a spare block based on a category of the previously stored data prior to writing the received page to the selected block.

24 Claims, 7 Drawing Sheets

ENHANCEMENT OF EFFICIENCY IN POWER FAILURE HANDLING IN FLASH MEMORY

CROSS-REFERENCE TO RELATED APPLICATIONS

This application claims the benefit of U.S. Provisional App. No. 61/207,679 filed Feb. 13, 2009, the entirety of which is incorporated herein by reference.

TECHNICAL FIELD

This application relates generally to managing data in a memory system. More specifically, this application relates to the operation of a memory system to improve efficiency with handling power failures.

BACKGROUND

NAND Flash storage devices are used as non-volatile storage, and are characterized, among other properties by a writing process in which data is being written in units of pages into larger units of blocks. The nature and physics of such writing process and the risk to data associated with it are generally understood. The data-at-risk is likely to be damaged when the power to the storage device fails in the midst of writing, and the power applied to the memory is not stable. A power failure, in portable devices such as mobile phone, happens whenever the host unexpectedly turns the device off to save on battery life or the user removes the device.

One technique for reducing the risk of losing or corrupting data when power failures occur defines "risk zones" and manages the writing process to minimize the risk by avoiding risky areas or by backing up data in risky areas. However, this method of reducing the risk is wasteful in energy consumption and performance, because of the amount of data that may need to be backed up. The backup process consumes a high amount of energy (being a writing process) and reduces the performance (as the extra data writing takes time) of the storage device. Both the extra amount of time and the extra amount of energy are directly proportional to the amount of data needs to be backed up.

BRIEF SUMMARY

In order to address the potential data loss posed by power failures, a storage system and a method are disclosed for planning the writing process by taking into account the context of the data being written and minimizing the amount of data back-up that is required for power failure immunity during a write process.

According to a first aspect, a method of managing backup of physical blocks in a storage system is disclosed, the method includes receiving a page of data for writing to a non-volatile memory in the storage system, selecting a block in the non-volatile memory having a desired back-up cost, and copying previously stored data in the selected block to a back-up block based on a category of the previously stored data prior to writing the received page of data to the selected block. The back-up cost may be determined by the amount of pages to copy into the back-up block based on the category of the previously stored data in each block. In alternative embodiments, selecting the block having the desired back-up cost may include selecting a block containing a fewest number of pages to copy into the back-up block based on the category of the previously stored data in each block or selecting a first block determined to contain less than a threshold number of pages that need copying into the back-up block based on the category of the previously stored data in the first block. The category of data may be a type of data that is always required to be backed-up or not required to be backed-up. The category of data may include file identifying information associating a page of data with a particular host file or a file type. The file types may include one of an ordinary file, a log file or a temporary file. Also, the data may be tagged in an implicit or virtual manner in another embodiment, where the storage device does not receive a separate flag or piece data explicitly associating the page of data with a category, file or file type. Instead, the storage device may be preconfigured to know that data received from the host in specific address ranges are to be treated with a particular back-up policy, such as "always back-up" or "do not back-up."

According to another aspect, a method of managing backup of physical blocks in a storage system includes a controller of the storage system receiving a page of data for writing to a non-volatile memory in the memory system. When an empty block is available, the controller writes the received page to the empty block. When no empty blocks are available, the controller writes the received page of data to a block only containing data of a same category as the received page of data; and when no empty blocks and no block only containing data of the same category as the received page of data are available, the controller selects a block in the non-volatile memory having a desired back-up cost, and copies previously stored data in the selected block to a back-up block based on a category of the previously stored data prior to writing the received page of data to the selected block.

In yet another aspect, a storage system is disclosed that includes non-volatile memory having a plurality of operative blocks and at least one spare block as well as a controller. The controller is configured to receive a page of data for writing to the non-volatile memory, select an operative block in the non-volatile memory having a desired back-up cost, and copy previously stored data in the selected block to a spare block prior to writing the received page of data to the selected block based on a category of the previously stored data.

DETAILED DESCRIPTION

The following terms, as used in this specification, are defined as set forth below:

Back-up cost—the time and energy needed to back-up data. This extra time and energy is proportional to the number of pages of data needing to be backed-up.

Classifying tag—an identification of a page of data that differentiates its context from other pages.

File—a collection of pages having a meaning as a group.

Log file—a log file is a file that does not lose its total value if part of it is corrupted. An example of a log file is a file that is written by appending data to its end.

Ordinary file—an ordinary file is one where the whole file is considered useless if part of it is damaged. One example of an ordinary file is an executable file.

Temporary file—a file that will not, if corrupted, result is any user data or critical system resource loss. Therefore, it does not need any backup. One example of a temporary file may be a document editor temp file, if the file is corrupted the editing application will need to be closed and re-opened but user data will not be affected.

Operative block—a physical block that is currently accessible to the host as a logical block.

Spare block—a physical block that not currently presented by the storage to the host as a logical block in an ordinary block device interface. These blocks can, optionally, be used internally by the storage device for housekeeping purposes.

Page—smallest physical (storage device dependant) writing unit.

Block—a group of pages in a flash storage device, where writing into one of the pages of a block can affect data in one or more other pages in the block, especially during a power failure.

Back-up writing—the process of reading the data from an operative block and writing it to a spare block.

Data writing—the process of writing data into an operative block.

Data at risk—data stored in a page, where another page in the same block is being written.

Figure 1:
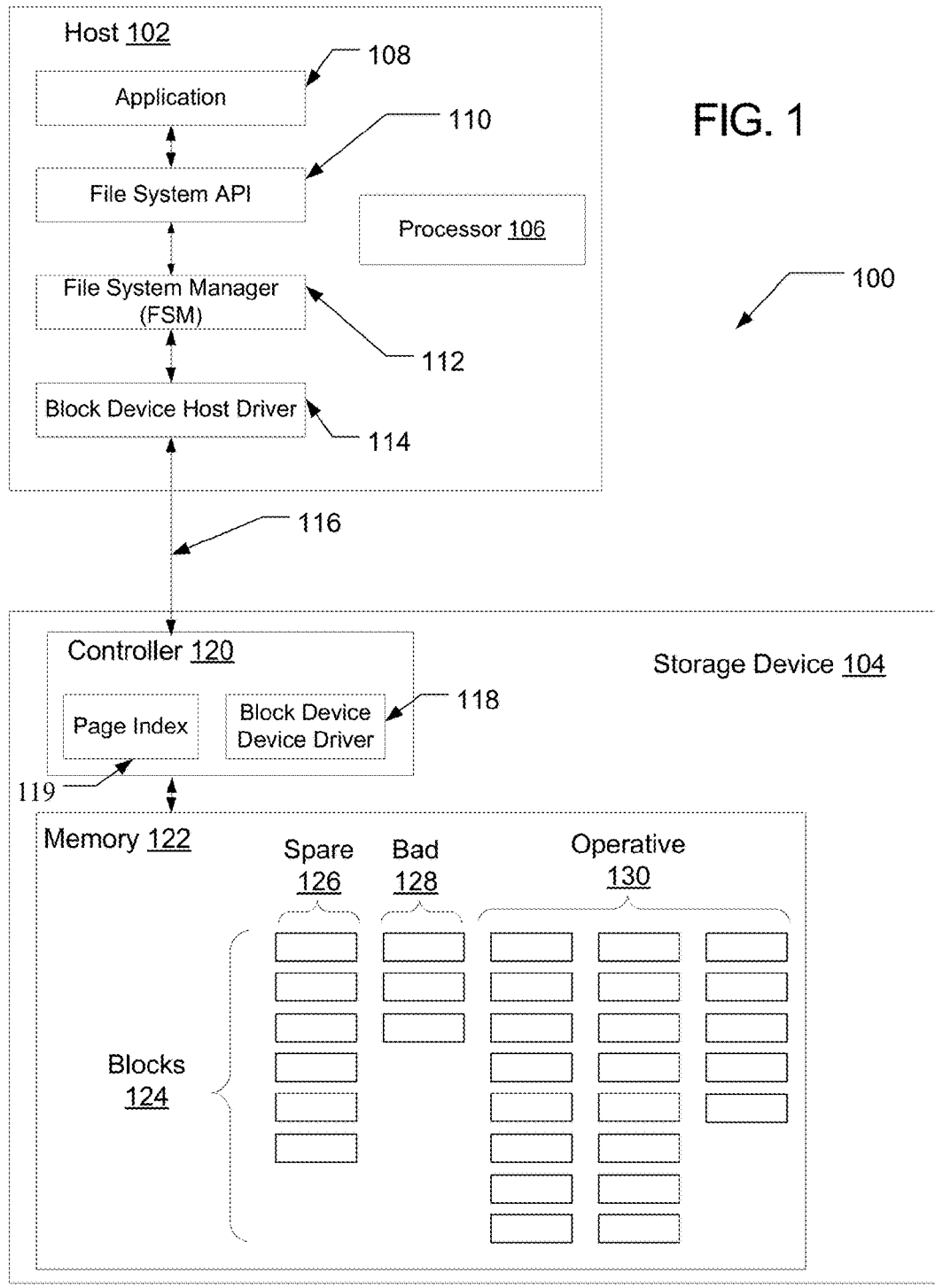
FIG. 1 illustrates a block diagram of a storage system and host according to one embodiment.

A non-volatile memory system 100 suitable for use in implementing aspects of the invention is shown in FIG. 1. A host 102 of FIG. 1 stores data into and retrieves data from a storage device 104. The storage device 104 may be flash memory embedded within the host, such as in the form of a solid state disk (SSD) drive installed in a personal computer. Alternatively, the storage device 104 may be in the form of a card or a USB storage that is removably connected to the host 102 through a mechanical and electrical connector.

The host 102 of FIG. 1 may include a processor 106 that runs one or more application programs 108. The application programs 108, when data is to be stored on or retrieved from the storage device 104, communicate through a file system application programming interface (API) 110 with the file system manager (HOST) 112. The FSM 112 manages the files in the storage device 104. Common operations executed by a FSM 112 include operations to create, open, move, copy, and delete files. The FSM 112 may be circuitry, software, or a combination of circuitry and software. Accordingly, the FSM 112 may be a stand-alone chip or software executable by the processor of the host 102. A block device host driver 114 translates instructions from the FSM 112 for transmission over an interface 116 between the host 102 and storage device 104. The block device interface 116 may be any of a number of known interfaces, such as SD, MMC, USB flash storage, SATA and SCSI interfaces.

A block device device driver 118 executed by the controller 120 of the storage device 104 manages communication with the host 102 over the interface 116. The controller 120 of the storage device 104 manages the memory 122. The controller 120 may convert between logical addresses of data used by the FSM 112 and physical addresses of the memory 122 during data programming and reading. The memory 122 includes physical blocks 124 of flash memory that each consist of a group of pages, where a block 124 is a group of pages in a flash storage device, where writing into one of the pages of a block can affect data in one or more other pages in the block and a page is a smallest unit of writing in the memory 122. The blocks 124 in the memory 122 include operative blocks 130 that are represented as logical blocks to the host 102. Some of the blocks 124 are bad blocks 128 that have been found to be bad or unusable and marked as such so that they are unavailable to the host 102. Others of the blocks 124 are spare blocks 126 that are not available to the host 102 and are used by the controller 120 to replace bad blocks 128. A page index 119 identifying data attributes of each page of data in the blocks is maintained in non-volatile memory on the controller 120.

Figure 2:
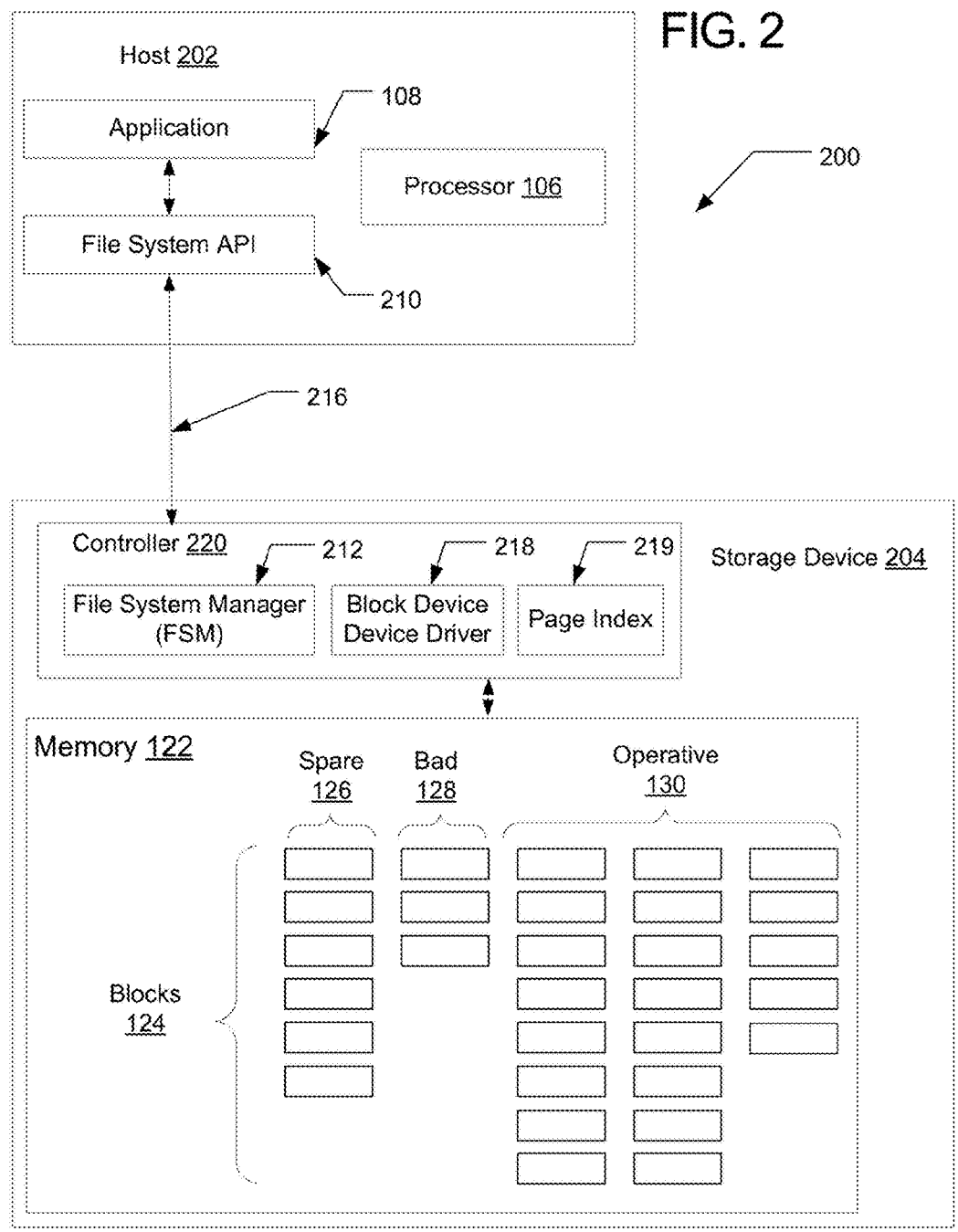
FIG. 2 illustrates a block diagram of an alternative embodiment of the storage system and host of FIG. 1.

In another embodiment, as shown in FIG. 2, the non-volatile memory system 200 may be arranged with the FSM 212 in the storage device 204. In this embodiment, a host 202 utilizes a file system API 210 that can communicate with the FSM 212 on the storage device over a file system interface 216, rather than a block device interface. Examples of suitable file system interfaces include SMB, NFS and Internet Protocol (IP) interfaces. The block device device driver 218 executed by the controller 220 of the storage device 204 manages communication between the FSM 212 and memory 122. A page index 219 identifying data attributes of each page of data in the blocks is maintained in non-volatile memory on the controller 220.

The memory 122 in this embodiment may be arranged in the same manner as illustrated in the embodiment of FIG. 1. An advantage of the FSM 212 being positioned on the storage device is the ability to design a storage device with any desired file system while not requiring a host device to use anything other than a standard file system API and file system interface. Although the description below may refer to the non-volatile memory system of FIG. 1, either of the embodiments of FIG. 1 or FIG. 2 may implement the methods described.

Using either of the systems described above, a method for enhancing efficiency in power failure handling may be implemented. The method includes planning a write operation so that a minimum amount of data needs to be backed up. Because the back-up process is a data writing process, it reduces performance and takes up energy. Both the amount of time and the amount of energy are directly proportional to the amount of writing for back-up. This extra time and energy may be characterized as a back-up cost to be minimized.

Figure 3:
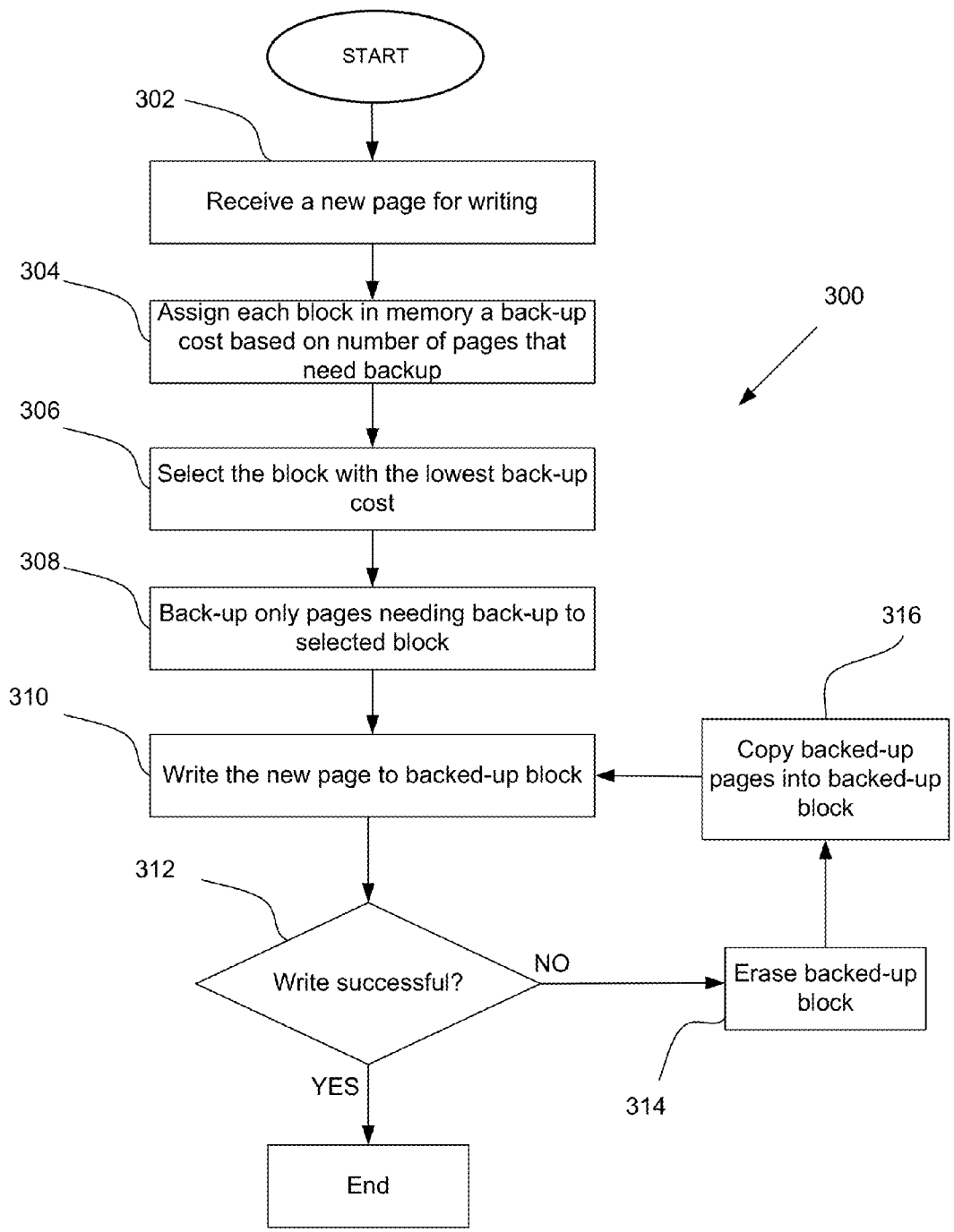
FIG. 3 is a flow diagram illustrating a method for improving power failure handling by minimizing the amount of pages to be backed-up prior to writing newly received data.

Referring to FIG. 3, one process 300 for improving efficiency in power failure handling is illustrated. When a new page of data is received at the storage device 104 for writing, the controller 120 of the storage device 104 determines a back-up cost for each operative block in memory based on an analysis of the number of pages that will have to be backed up in each block if the new page is to be written into that block (at 302, 304). The fewer the number of pages needing to be backed-up, the lower the back-up cost. In one implementation, the controller selects the block determined to have the lowest back-up cost for accommodating the new page (at 306).

Once a block is selected to receive the new page, any page already in that selected block that needs to be backed up are copied to an unused block (at 308) and then the new page is written into the selected block (at 310). If the writing operation of the new page to the selected block was successful (at 312), the process ends. If the writing operation fails, typically due to interruption by a power failure, then the selected block is erased (at 312, 314), the backed up pages are copied from the back-up block to the selected block (at 316), and the attempt to write the new block is repeated (at 310).

In order to determine what the back-cost will be for a block, the controller looks at the type of data in the received page and of the pages already stored in a particular block. The identity of the file being written can be obtained from the host 102, which may tag all the pages that belong to the same file, or can be guessed by the controller of the storage device from the circumstances—for example by reading the stored file system structures or by tracking the continuum of pages in a sequential write process. The file tag information provided by the host 102 or determined by the controller of the storage device may include specific data identification information, data type information, or a combination of both. All pages of an ordinary file share a unique tag, differentiating them from pages that belong to other files. Examples of data tagging techniques that may be utilized in the disclosed systems and methods are set forth in U.S. application Ser. No. 12/030,018, filed Feb. 12, 2008 and published as US Pub. No. 2008/0307158, as well as in U.S. application Ser. No. 11/760,480, filed Jun. 8, 2007 and published as US Pub. No. 2008/0307156, wherein the entirety of each of these references is incorporated herein by reference.

Referring to FIGS. 4A and 4B, a simplified diagram of a portion of the memory 122 of the storage device of FIG. 1 is shown where a common back-up method is implemented. FIG. 4A illustrates several operative blocks 402, 404, 406, 408 and a spare block 410, separated by line 412 for ease of reference. Each of the blocks includes a plurality of pages. The example of FIGS. 4A and 4B shows three files, distinguishable by the pattern of hatching. Block 402 contains empty pages 414 and written pages 416 that belong to file A. Block 404 is an empty block containing only empty pages 414. Block 406 contains written pages 418 that belong to file B and written pages 420 that belong to file C. Block 408 also contains written pages 418 of file B and written pages 420 of file C. FIG. 4A shows an example of one approach of backing up at-risk data. In this example, new page 422 is to be written to a free page 424 in block 408. As page 422 belongs to file A, the data in block 408 is at risk of being lost. If power fails for the storage device during the writing process, the data in all the other pages in the block are at risk. One way to reduce this risk is to back up all the pages that may be corrupted prior to the writing of the new page into a spare block. Arrow 423 represents all of the written pages of block 408 being copied to spare block 410.

As illustrated in FIG. 4B, after block 408 is copied into back-up block 410, page 422 is written to empty page 424 in block 408. If no power failure occurred during the writing of page 422, then page 422 becomes part of block 408 and the backup block 410 may be abandoned. If a power failure did occur during writing, as soon as the power is restored block 408 is erased, and the back-up block 410 is copied back into block 408 as indicated by line 426, where all the original data of the block 410 (i.e. not including the page 422) is recovered. In this example, no back-up policy relating to minimizing the back-up cost was implemented and thus the cost was relatively high: 11 pages had to be backed-up for block 408.

Figure 4:
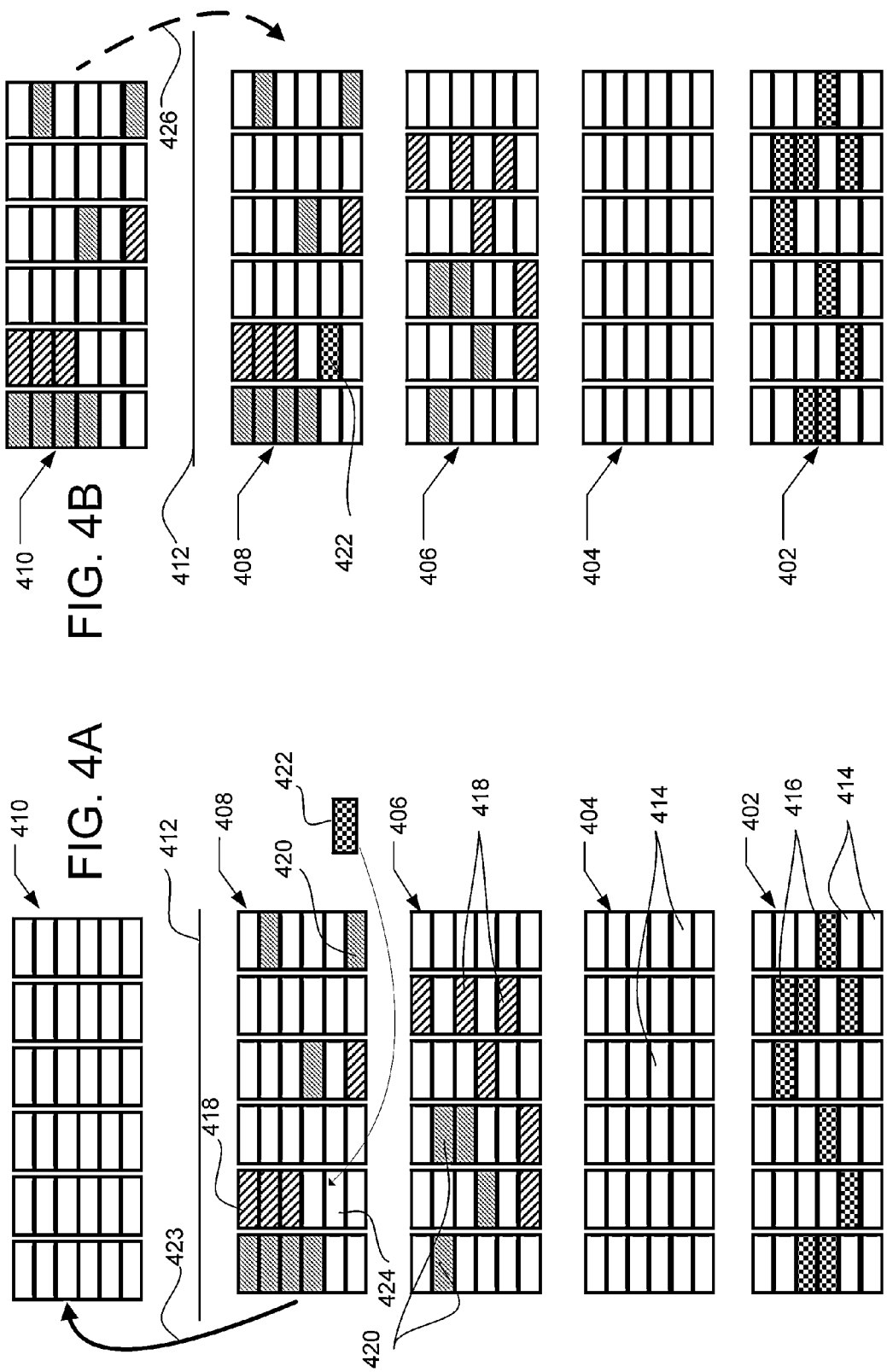
FIGS. 4A and 4B shows a portion of memory being backed-up according to a prior art method prior to a write operation and after the write operation.

As an improvement to the prior art example of FIG. 4, when selecting a block for use in writing the received page, the storage device 104 can implement a back-up policy where it will prefer to write pages only into blocks that are "legitimate blocks". These "legitimate blocks" can be either empty blocks, or blocks that contain only pages that belong to the same file as the newly received page. The storage device 104 can recognize the file-identity of pages in the block using tags that are attached to the pages, or are pointing at the pages, and relate the page to a specific file. This can be achieved by keeping a page index 119 on the storage device 104 that lists all the tag numbers that are represented in each page, and referring to this index when deciding where to write each page.

According to different implementations discussed below, the controller of the storage device 104 will minimize the number of pages that need to be backed-up during operation of the storage device by implementing one or the other of the above-noted techniques as a back-up policy. One example of such a policy is shown in FIGS. 5A-5B, where the controller operates to preferentially route a received page of data to a block having only data that belongs to the same file. Referring to FIG. 5A, the same simplified diagram of a portion of the memory 122 of the storage device of FIG. 1 is shown as in FIG. 4A. Operative blocks 502, 504, 506, 508 and a spare block 510, separated by line 512 for ease of reference, are illustrated and pages for three different ordinary files are illustrated with different hashing in the same manner as in FIG. 4A.

In FIGS. 5A and 5B, a back-up policy is illustrated where, when such a block is available, pages of a file are written to a block only containing pages of that same file. Implementing this policy, the controller 120 automatically routes the received page to an available page in operative block 502 as shown by line 511 based on the data tag information associated with the received page and the previously written pages. The remaining blocks 504, 506, 508 and 510 all either contain pages for more than one file or no data. When all the data in the block belongs to the same file as the newly received page of data, as is the case with page 522 and block 502, none of the data in the block needs to be backed-up. This is illustrated in FIG. 5B which shows the status of the memory immediately after writing page 522 into block 502. Unlike the situation in FIG. 4B where all the data needed to be backed up, nothing is backed-up when writing page 522 to block 502. The assumption here is that for some files (such as ordinary files) if a part of a file is damaged, then the whole file is considered damaged, and has to be re-written. Therefore, there is no need to backup parts of such a file that is currently being written. Accordingly, by writing such file only into blocks that do not contain other files, there is no need to back-up the block prior to writing the page. In order to take advantage of this feature, a back-up policy such as illustrated in FIGS. 5A and 5B may be implemented to direct incoming pages of an ordinary file to a block only containing pages of that same file so that unnecessary backups may be avoided.

Figure 5:
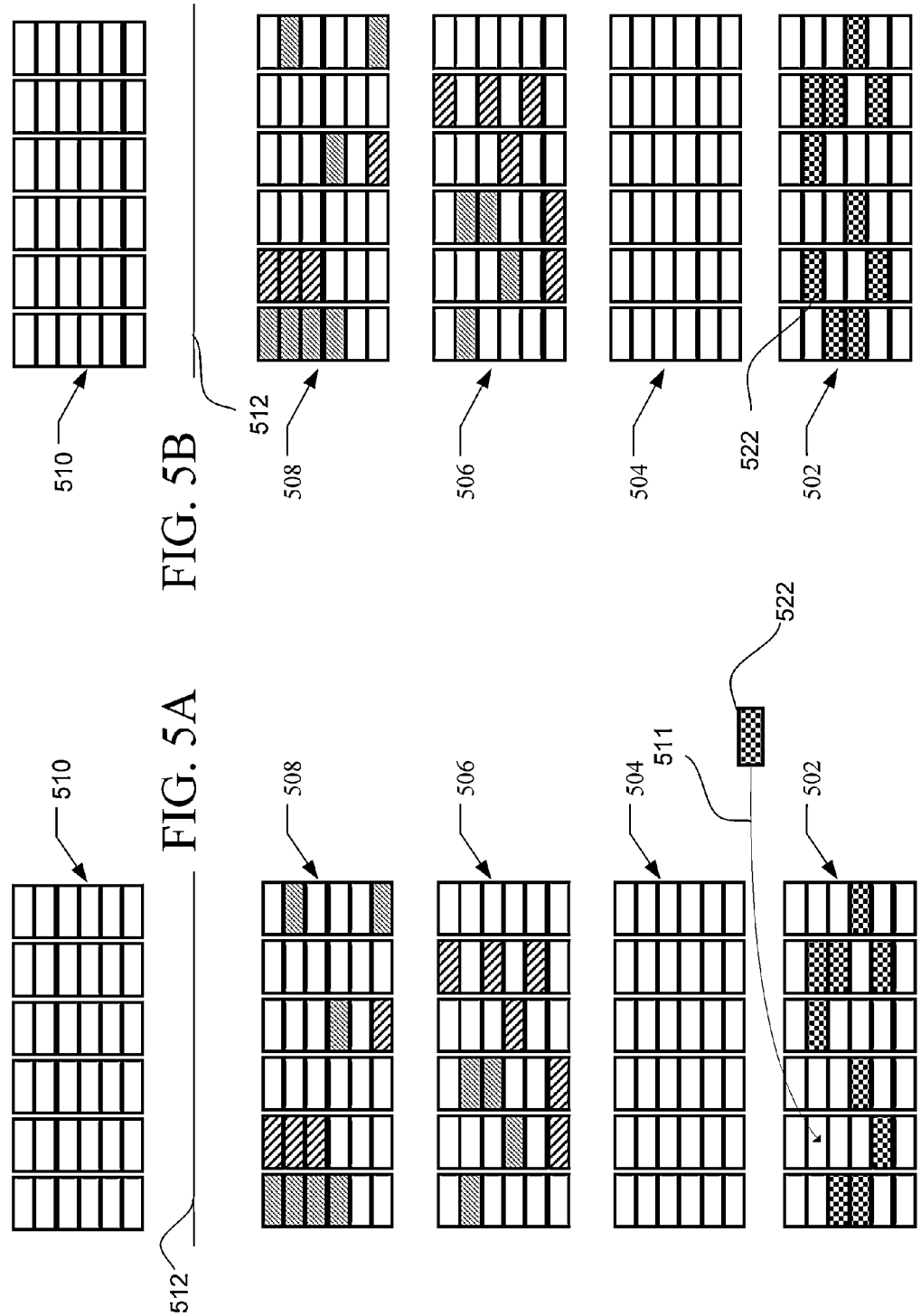
FIGS. 5A and 5B shows the portion of memory of FIG. 4A handled according to a first back-up policy prior to and after a write operation.
Figure 6:
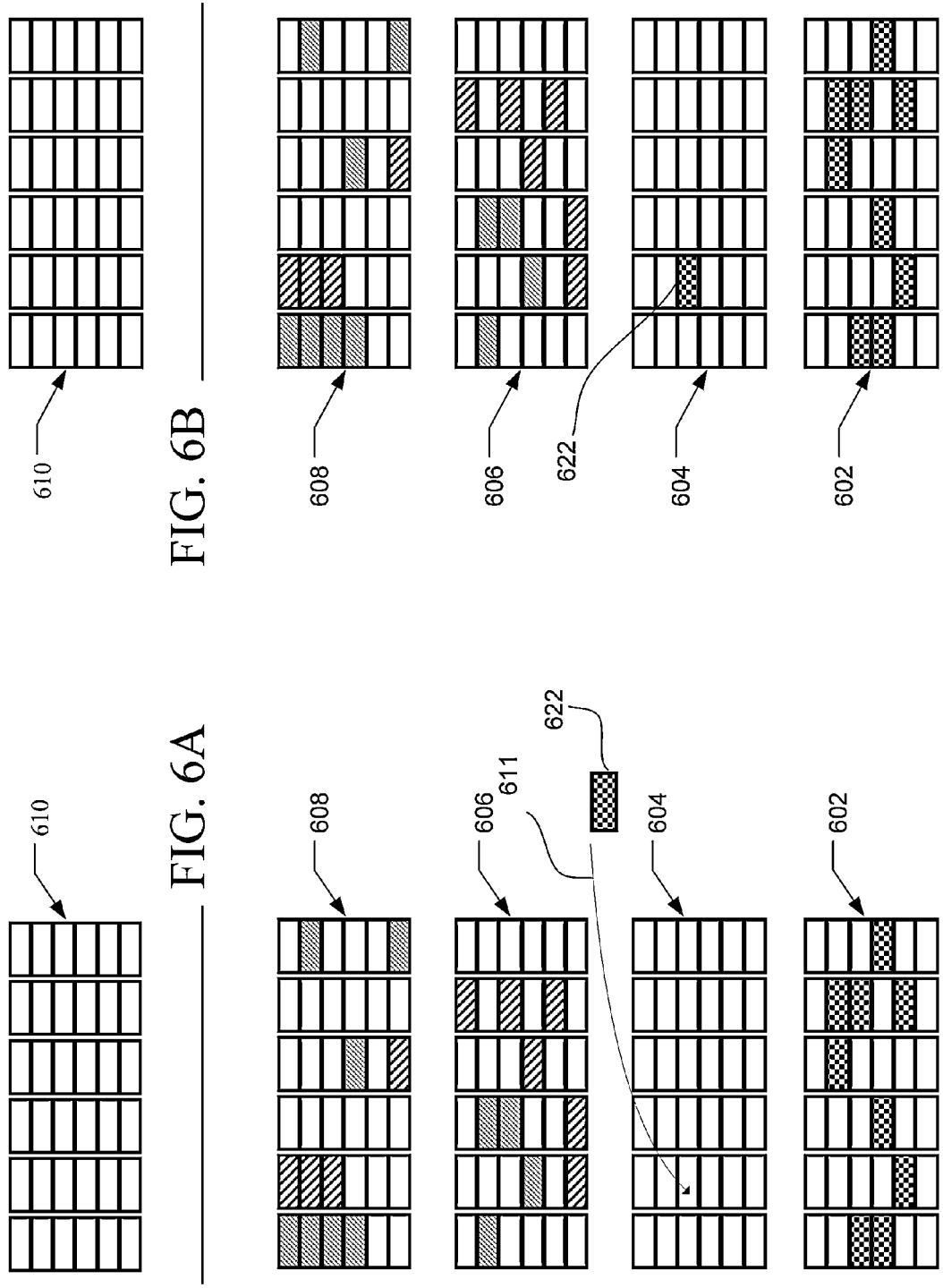
FIGS. 6A and 6B shows the portion of memory of FIG. 4A handled according to a second back-up policy prior to and after a write operation.

An embodiment of another back-up policy is shown in FIGS. 6A and 6B, where the controller is configured to write a newly received page to an empty block. FIG. 6A illustrates the same initial arrangement of blocks 602, 604, 606, and 608 as in the portion of memory shown in FIGS. 4A and 5A, however the controller 120 of the storage device 104 writes the newly received page 622 to empty block 604 in this embodiment, as shown by line 611. The resulting arrangement of the illustrated portion of memory after the write operation is then seen in FIG. 6B, where no data has been backed-up to the spare block 610 that would be used to back-up. Because there was no valid data present in the empty block 604, no data required back-up. As a result of the back-up policies illustrated in FIGS. 5 and 6, the back-up cost in each instance was significantly lower (no data needed to be copied) than the prior art method of FIG. 4 that did not apply a policy for reduce back-up cost and necessitated the back-up of a number of pages of user data.

The back-up policies illustrated in FIGS. 5 and 6 may be used separately or in combination. For example, a combined back-up policy utilizing both techniques may give preference to the controller first trying to locate an operative block that is empty, and if no such block is available, then the controller will look to write the newly received page of data to an operative block that only has pages that belong to the same file as the newly received page. If neither option is available, then to the block containing the fewest pages of valid data may be selected in one embodiment.

Figure 7:
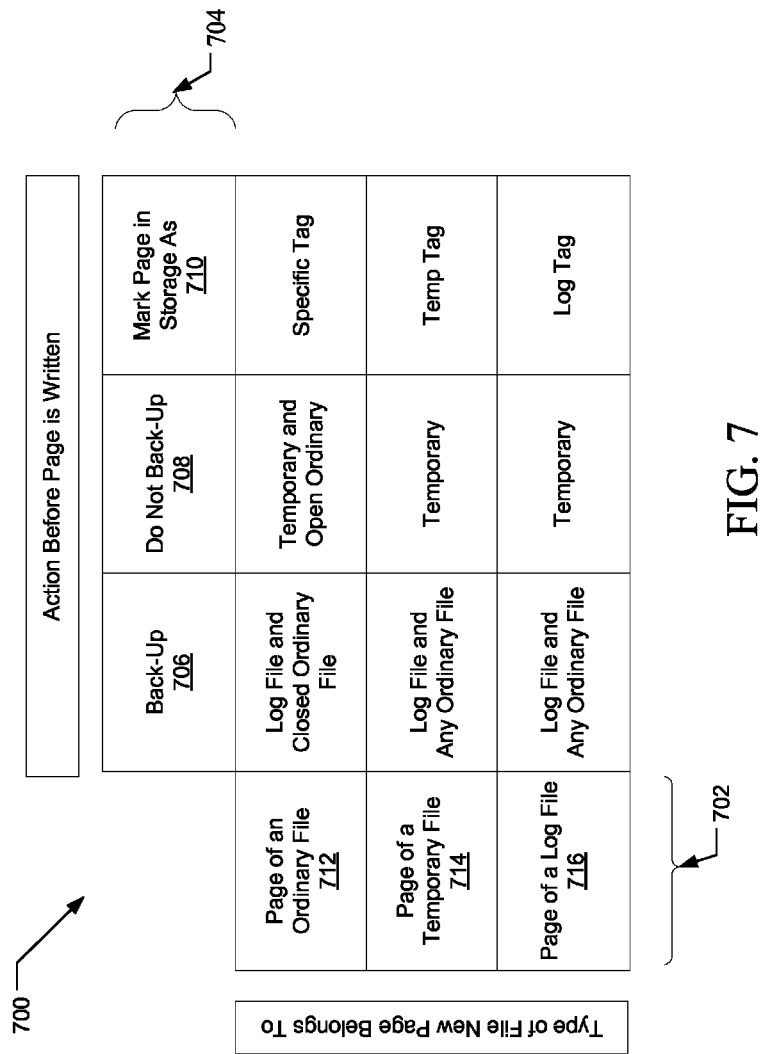
FIG. 7 illustrates a table representing a back-up policy for use by the controller of a storage device implementing the method of FIG. 3.

It should be noted that the above description of FIGS. 5 and 6 applies to blocks that store ordinary files only. If data of multiple types is written to the operative blocks in memory 122, the back-up policy may be different. For example, a back-up policy may be applied that is based on one or both the file associated with the data and the data type. One embodiment of a back-up policy for reducing back-up cost during write operations, where different data types are considered, is illustrated in FIG. 7 which shows a table 700 listing the back-up policy in certain contexts. This back-up policy table 700 may be stored in non-volatile memory in the controller 120 of the storage device 104 as a table or a set of executable instructions. The back-up policy of FIG. 7 may be used independently of, or in conjunction with other back-up policies such as one or both of the back-up policies illustrated in FIGS. 5-6. For example, the controller 120 may look for the lowest back-up cost solution by first looking for an empty block, then looking for a block only having pages of information of the same type as the received page of data if no empty block is available, and then looking for a block requiring the least number of pages needing back-up according to the back-up policy of FIG. 7 if the empty block or block with only the same type of data is not available. Other combinations of back-up policy preferences are also contemplated to minimize the back-up cost.

Referring to the back-up policy illustrated in FIG. 7, the cells of the first column 702 describe the type of file that a newly received page of data belongs to. The cells of row 704 head columns that describe the back-up action executed by the controller of the storage device before the new page identified in column 702 is written. Cell 706 heads the column listing the types of files that need to be backed-up, cell 708 heads the column listing the types of files that do not need to be backed-up, and cell 710 heads the column identifying the type of marking the newly received page will receive in the storage device. In the embodiment of FIG. 7, the controller may execute back-up and marking operations differently depending on the type of file received.

If the received new page is a page of an ordinary file (cell 712), then the controller will back-up pages of log files and closed ordinary files, will not back-up any temporary or open files, and will mark the new page with a specific tag in the table or other data array maintained in the storage device identifying the category or type of file for each page of data. The phrase closed ordinary files refers to any pages of ordinary files that are not actively being written to, which in most cases will refer to any files other than the file corresponding to the new page currently being written. An open ordinary file is generally the file that corresponds to the file of the new page being written to the selected block.

If the received new page is a page of a temporary file (cell 714), then the controller 120 will back-up pages of log files and ordinary files, will not back-up any temporary or open files, and will mark the new page with a specific tag in the table or other data array maintained in the storage device identifying the category or type of file as temporary. All temporary files may have the same global tag. In this implementation, a page of a temporary file is generally categorized as never to be backed-up and is considered expendable. Cell 82 refers to avoidance from backing up of some files when an ordinary file is written: ordinary files that belong to one of the files open for writing and temporary files.

If the received new page belongs to a log file (cell 716), the back-up policy requires log files to be backed-up. Only log files and ordinary files should be backed up, while temporary files will not be backed-up. Also, log files will be tagged with the same global tag.

In another embodiment, rather than categorizing pages of data with a classifying tag that refers to the file type (e.g. ordinary, temporary and log), the host may tag pages of data according to address region in the memory the host assigns the data to. For example, the address space accessible by the host may be sub-divided in different segments where each segment is already associated with a back-up policy. In other words, by writing a page of data to a specific address, the host can tell the storage device to back-up, or not back-up, the data without providing an explicit tag over the interface. This virtual or implicit tagging technique may be implemented by designating segments in the memory with unique defined address ranges as "back-up" or "non back-up" regions that the controller is aware of. The controller on the storage device will automatically apply the predetermined back-up policy for any data received in the designated segments. The information regarding back-up policy and associated ranges may be preconfigured in the storage device upon manufacture or configured by the host. A back-up policy and address range table may be maintained in non-volatile memory in the controller.

Accordingly, the tag that has been described in other embodiments as indicating the type and identity of the file of the page may be a virtual tag that the FSM does not have to specify explicitly. In this embodiment of implicit or virtual data tagging, the host allocates the virtual tag according to available storage area segments, and writes clusters of data from a file, or file type, only to a segment associated with that file or file type.

As has been described above, methods and systems for minimizing the amount of back-ups necessary to protect against data losses due to power failure may use of the category of data received, as well as the category of data already written to blocks in memory to minimize the amount of data that needs to be backed up by avoiding the writing of a page in a block that contains data of other files. The information on the category of data may be provided by the host tagging pages of data and the controller of the storage device may record the data category information in a table or index 119 that maps the category of each page in each block. The tag information can be obtained from a FSM (or any other executable module), which may be located on a host device or incorporated into the controller in different embodiments. The tag may be indicative of the page category where the category may represent data considered to be always disposable after a power failure and never requiring backup prior to writing a new page, or data considered to always be non-disposable and requiring backup whenever a new page can be written to the block. The category of the data in a previously received page may also represent data that may or may not require back-up depending on the category of the data in the newly received page of data.

The category of data in the received page and of data already residing in the block being examined, which may include one or more of file identifying information or file type information, may be used to determine how many pages will need backing-up from the block. If the blocks contain pages of different types, such as log files and/or temporary files, then the back-up policy may be different. The storage device may be configured to write received pages to empty blocks, to use the tagging information to write received pages only to blocks that only have other pages from the same file, and/or use the tagging information to apply a more sophisticated back-up policy that allows the storage device to determine the back-up cost of writing a page of data into various blocks in memory and choose the block having the lowest back-up cost (e.g. the fewest number of pages that would need to be backed-up). In this manner, the embodiments described above permit a storage device to minimize data loss in case of a power failure during a write operation while also minimizing the time and energy necessary to back-up data during the write operation.

It is therefore intended that the foregoing detailed description be regarded as illustrative rather than limiting, and that it be understood that it is the following claims, including all equivalents, that are intended to define the spirit and scope of this invention.

What is claimed is:

1. A method of managing backup of physical blocks in a storage system, the method comprising a controller of the storage system:
   receiving a page of data for writing to a non-volatile memory in the storage system;
   selecting a block in the non-volatile memory having a desired back-up cost;
   determining a category of previously stored data in the selected block; and
   copying, depending on the determination of the category, the previously stored data in the selected block to a back-up block prior to writing the received page of data to the selected block;
   wherein when the determination of the category comprises determining a file type, the copying is only when the determined file type is different than a file type associated with the received page of data.

2. The method of claim 1, wherein selecting the block in the non-volatile memory having the desired back-up cost comprises selecting a block in the non-volatile memory containing a fewest number of pages to copy into the back-up block based on the category of the previously stored data in each block.

3. The method of claim 1, wherein selecting the block in the non-volatile memory having the desired back-up cost comprises selecting a first block determined to contain less than a threshold number of pages that need copying into the back-up block based on the category of the previously stored data in the first block.

4. The method of claim 1, wherein the category of data comprises a type of data, wherein one type of data comprises data that is always backed-up.

5. The method of claim 4, wherein the category of data comprises a type of data that is never backed-up, wherein the category is indicative of a file being disposable after a power failure and not requiring backup prior to writing a new page.

6. The method of claim 5, wherein the type of data for each page of received data is determined internally at the storage device based on an address of the received data.

7. The method of claim 1, wherein received data is received from a host along with a data tag identifying the category of data for the received page.

8. The method of claim 1, wherein the category of data includes file identifying information associating a page of data with a particular file.

9. The method of claim 1, wherein the category of data comprises an address region of the memory.

10. The method of claim 1, wherein the file type comprises one of a ordinary file, a log file or a temporary file.

11. The method of claim 10, wherein copying previously stored data comprises:
    copying a page of previously stored data from the identified block to the back-up block only when the file type of the page of previously stored data identifies a log file or an ordinary file associated with a host file different than that associated with the received page of data.

12. The method of claim 11, wherein the file identifying information of the previously stored data is stored in an index table in the non-volatile memory and identifying the block in the non-volatile memory having the lowest back-up cost comprises determining which block requires a fewest number of pages copied to the back-up block based on the index table.

13. The method of claim 1, further comprising the controller tagging each received page of data with a respective category.

14. A storage system comprising:
    non-volatile memory having a plurality of operative blocks and at least one spare block; and
    a controller configured to:
      receive a page of data for writing to the non-volatile memory in the storage system;
      select an operative block in the non-volatile memory having a desired back-up cost;
      determine a category of previously stored data in the selected block, wherein the determined category comprises a type of data, a file type, or file identifying information; and
      copy, depending on the determination of the category, previously stored data in the selected block to a spare block prior to writing the received page of data to the selected block, wherein the copy is only when the determined category is different than a category associated with the received page of data.

15. The storage system of claim 14, wherein to select the operative block in the non-volatile memory having the desired back-up cost the controller is further configured to determine which operative block in the non-volatile memory contains a fewest number of pages to copy into the back-up block based on the category of previously stored data in each operative block.

16. The storage system of claim 14, wherein to select the operative block in the non-volatile memory having the desired back-up cost the controller is further configured to select a first operative block determined to contain less than a threshold number of pages that need copying into the back-up block based on the category of the previously stored data in the first operative block.

17. The storage system of claim 14, wherein the type of data comprises a type of data that is always backed-up.

18. The storage system of claim 14, wherein the type of data comprises a type of data that is never backed-up, wherein the category is indicative of a file being disposable after a power failure and not requiring backup prior to writing a new page.

19. The storage system of claim 14, wherein the file identifying information associates a page of data with a particular file.

20. The storage system of claim 14, wherein the category further comprises information identifying an address region in the memory the received page of data is assigned to.

21. The storage system of claim 4, wherein the file type comprises one of an ordinary file, a log file or a temporary file.

22. The storage system of claim 21, wherein the controller is further configured to copy previously stored data from the selected operative block to the back-up block only when the file type of the page of previously stored data identifies a log file or an ordinary file associated with a file different than that associated with the received page of data.

23. The storage system of claim 22, further comprising an index table in the non-volatile memory containing the file identifying information of the previously stored data is stored in and wherein the controller is configured to identify the operative block in the non-volatile memory having the lowest back-up cost based on a review of the index table to determine which block requires a fewest number of pages copied to the back-up block.

24. The storage system of claim 14, wherein the controller is further configured to tag each received page of data with a respective category.

\* \* \* \* \*